(12) United States Patent
Akdogan et al.

(10) Patent No.: US 9,501,509 B2
(45) Date of Patent: Nov. 22, 2016

(54) THROWAWAY SPATIAL INDEX STRUCTURE FOR DYNAMIC POINT DATA

(71) Applicants: Afsin Akdogan, Los Angeles, CA (US); Cyrus Shahabi, Irvine, CA (US); Ugur Demiryurek, Redondo Beach, CA (US)

(72) Inventors: Afsin Akdogan, Los Angeles, CA (US); Cyrus Shahabi, Irvine, CA (US); Ugur Demiryurek, Redondo Beach, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 137 days.

(21) Appl. No.: 14/482,805

(22) Filed: Sep. 10, 2014

(65) Prior Publication Data

US 2015/0248450 A1    Sep. 3, 2015

Related U.S. Application Data

(60) Provisional application No. 61/875,874, filed on Sep. 10, 2013.

(51) Int. Cl.
*G06F 17/30* (2006.01)
*G06F 7/00* (2006.01)

(52) U.S. Cl.
CPC ... *G06F 17/30327* (2013.01); *G06F 17/30241* (2013.01)

(58) Field of Classification Search
USPC .......................................................... 715/743
See application file for complete search history.

(56) References Cited

U.S. PATENT DOCUMENTS

| | | | | |
|---|---|---|---|---|
| 7,047,021 B2* | 5/2006 | Ohto | ..................... | H04W 40/20 455/456.1 |
| 7,952,583 B2* | 5/2011 | Waechter | ................ | G06T 15/06 345/426 |
| 2013/0138646 A1* | 5/2013 | Sirer | ................ | G06F 17/30545 707/736 |
| 2014/0075004 A1* | 3/2014 | Van Dusen | ............ | H04L 41/04 709/223 |

* cited by examiner

*Primary Examiner* — Kuen Lu
(74) *Attorney, Agent, or Firm* — McDermott Will & Emery LLP

(57) ABSTRACT

The present disclosure relates to a short-lived throwaway index structure for generating an index from scratch in a short period of time rather than updating an index with every location change of moving objects. Rapid index construction results from the generation of Voronoi diagrams in parallel using multiple cloud servers simultaneously.

4 Claims, 3 Drawing Sheets

THROWAWAY SPATIAL INDEX STRUCTURE FOR DYNAMIC POINT DATA

CROSS-REFERENCE TO RELATED APPLICATION

This application claims priority from U.S. Provisional Patent Application No. 61/875,874, filed on Sep. 10, 2013, the contents of which are incorporated herein by reference.

STATEMENT AS TO FEDERALLY SPONSORED RESEARCH

This invention was made with government support under National Science Foundation (NSF) grant number IIS-1115153. The government has certain rights in the invention.

BACKGROUND

The capabilities of collecting people's location data have been growing rapidly with the fast progress of mobile, satellite, sensor, and video technologies. These spatial moving object datasets have enabled numerous new applications. Social networking services such as Facebook and Foursquare discover other people nearby a user; retail stores and malls combine real-time customer location data with geo-fencing for targeted marketing; mobility managers embed GPS in cars/taxis to better monitor and guide vehicles; animal scientists attach telemetry equipment on the wildlife to analyze ecological behavior. Massive-scale moving object data are becoming ubiquitous.

The Holy Grail is to design a scalable method that can efficiently handle frequent updates and search this massive ever-changing spatial data. However, the challenge is that there is a tradeoff between search and update in index structures; namely, an index is either update or search efficient.

Although moving object index structures alleviate this tradeoff to some extent with sophisticated techniques, massive data, frequent updates and large query volume give rise to a major scalability problem given the performance bottleneck of their single-server designs. In addition, these moving object indexing approaches make the simplifying assumption that extra information about the objects' movement behavior exists (e.g., direction and velocity). Due to the above reasons and also because of the complexity of maintaining these index structures, unfortunately they have not been deployed in any real-world system or application.

Alternatively, another group of studies focused on devising distributed versions of successful spatial index structures, leveraging the power of cluster of servers to scale out. However, their focus has not been on moving objects that result in frequent index updates, which is even less efficient with a distributed index structure than its centralized version due to the high network cost.

Accordingly, it is desirable to provide a system whereby server nodes may be leveraged for efficient data updates.

SUMMARY

A new scalable algorithm can build a spatial index in parallel so fast that it is more efficient to frequently generate the index from scratch than to update it, even if only a small portion of the objects are moving. This is analogous to the concept used in computer graphics where the content of the display memory is created entirely from scratch (e.g., 60 times a second) rather than keeping data structures that maintain the updates from one memory frame to the other. The simplicity of not dealing with updates and the new trend of inexpensively scaled servers in the cloud make the present system more attractive for real-world applications.

In one aspect, a method may comprise; finding, by at least one computer system in response to a query having an associated location in a network of nodes and edges, a specified number of data objects, distributing point objects across multiple servers, generating a local Voronoi diagram at multiple servers, identifying inaccurate Voronoi cells, replicating border cells, and generating a hierarchical Voronoi index structure at each server. The method may also comprise using the index structure to perform data object and edge weight updates.

In another aspect, a computer-readable medium encoding a computer program product operable to cause data processing apparatus of a searching system, to perform operations, may comprise; finding, in response to a query having an associated location, a specified number of data objects, distributing point objects across multiple servers, generating a local Voronoi diagram at multiple servers, identifying inaccurate Voronoi cells, replicating border cells, and generating a hierarchical Voronoi index structure at each server. The operations performed may also comprise using the index structure to perform data object and edge weight updates.

These and other aspects, objects, features and advantages are specifically set forth in, or will become apparent from, the following detailed description of an exemplary embodiment of the invention.

BRIEF DESCRIPTION OF THE DRAWINGS

The above and other aspects will become more apparent by the following detailed description of exemplary embodiments thereof with reference to the attached drawings, in which.

DETAILED DESCRIPTION

Figure 1:
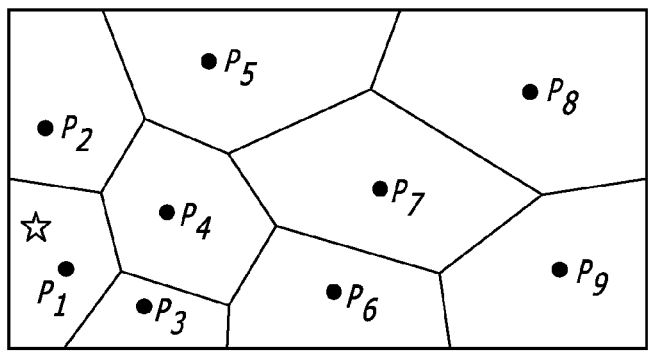
FIG. 1 is an exemplary diagram of a Voronoi diagram and its cells for nine generators, according to an embodiment.

The following detailed description is not to be taken in a limiting sense, but is made merely for the purpose of illustrating general principles.

Illustrative embodiments are now discussed and illustrated. Other embodiments may be used in addition or instead. Details which may be apparent or unnecessary may be omitted to save space or for a more effective presentation. Conversely, some embodiments may be practiced without all of the details which are disclosed.

The fundamental construct of the spatial index structure, dubbed "ToSS-it" (for Throwaway Spatial Index Structure), is a Voronoi diagram, which is an extremely efficient data structure to answer spatial queries. Hence, one goal is to construct a Voronoi diagram on all the point data (e.g., moving objects) rapidly and in a distributed fashion. The challenge is that this global Voronoi diagram should be broken and stored on multiple nodes of the cloud. The intuitive approach to accomplish this is to first build the global Voronoi over all the points (in parallel) and then partition it across the cloud servers. This build-first-distribute-later class of approaches has been recently proposed.

However, in the present system a completely different approach of distribute-first-build-later is taken. First all the points across cloud servers are distributed and then local Voronoi diagrams are constructed at each server. These local Voronoi diagrams may include some inaccurate Voronoi cells because some of their points' neighbors are residing in a different server. Therefore, some information may be sent between servers to ensure that the cells are accurate and, if not, to fix them. The more the number of these inaccurate cells, the more information will be needed to be transferred over the network which results in inefficiency.

Thus, a three-step approach is proposed to address this challenge. First, ToSS-it minimizes the number of network messages during the index creation by adapting an intelligent partitioning technique that quickly learns from the dataset and distributes the objects across the servers while preserving the spatial proximity among the objects. Second, a technique may quickly identify whether or not a generated cell at a server is accurate and refine inaccurate cells effectively. Third, the number of network messages is further reduced by replicating the border points so that the points with inaccurate cells can be fixed using only the local information without requiring any message passing. Note that since ToSS-it is read-only, there is almost no cost in maintaining redundant points across servers. Finally, to expedite spatial query processing at each node even further, hierarchical index structure is constructed on top of local Voronoi cells. This is achieved by decoupling local Voronoi cell generation at each node and hence exploiting the multi-core CPUs available on each server. Consequently, ToSS-it not only can scale out because of a novel three-step distribute-first/build-later technique, but also can scale up due to an intra-node parallelization during the local index construction.

Although most of the current studies in cloud computing have focused on scaling out, it is crucial to utilize multi-core CPUs as chip vendors such as Intel have recently shifted to multicore architecture rather than increasing processor speeds.

Several experiments were performed by fully implementing ToSS-it on the Amazon cloud. ToSS-it yields a very high query throughput and scales near-linearly with the number of nodes in the cluster. For example, ToSS-it can be generated in less than 40 seconds using 128 servers and process about 30,000 circular range queries per second. The total execution time remains almost constant as the data size increases. Moreover, if at least 7% of the objects are moving and issue updates to the index, it is faster to recreate ToSS-it from scratch than updating state-of-the-art cloud-based index structure, RT-CAN. In addition, with ToSS-it, a query can be forwarded to any node and this decentralization provides load-balancing across the nodes.

The index structures used in dynamic databases (e.g., Facebook, Foursquare, Waze, and such) receive tremendous amounts of updates in short intervals from the users. In such situations, current technologies delay the updates for certain periods of time to be able to reconstruct the indexes. The present approach efficiently handles frequently updated datasets by recreating the entire index structure from scratch within several seconds. In addition, as the data size increases, index construction time remains almost constant which improves the scalability.

Now we explain our parallel Voronoi generation algorithm that uses multiple servers in the cloud. The main idea behind our approach is first distribute all point objects across multiple cloud servers, and then build local Voronoi diagrams at each server (i.e., distribute-first-build-later). We discuss our 3-step approach in order to minimize the number of messages passed among the cloud severs during the Voronoi construction, i.e., 1) intelligently distribute the objects across the servers, 2) quickly identify the inaccurate Voronoi cells and 3) replicate the border cells. Next, we present our hierarchical Voronoi index structure that is built in each cloud server to expedite the query processing at each node. This index consists of multiple layers representing local Voronoi cells at different levels of granularity. Finally, we discuss how we use our proposed index structure ToSS-it to answer a variety of spatial queries.

Parallel Voronoi Diagram Generation-Given a set of scattered point objects 0 in the plane and N servers (nodes) in cloud, our goal is to generate Voronoi diagram of 0 using N servers in parallel.

We used a build-first-distribute-later approach and modeled distributed VD generation problem using the MapReduce framework. Specifically, we generate partial Voronoi diagrams (PVD) in each node in parallel and merge the (partial) results in a single node to build one global Voronoi Diagram. Subsequently, we partition and redistribute the global Voronoi Diagram to each node for parallel query processing. The main shortcoming of this build-first-distribute-later approach is its limited scalability as the single node that constructs the global Voronoi Diagram becomes the system bottleneck.

We propose a completely different approach that addresses the scalability shortcoming of our previous method. The main idea of ToSS-it is to distribute-first-build-later. That is, we first effectively distribute the objects across the nodes to balance the load at each node. Next, we build local Voronoi diagrams at each node. The challenge is that even though the objects are distributed effectively, when O is divided into disjoint subsets, some of the generated local Voronoi diagrams will be inaccurate as their neighbors reside in different nodes. The nodes need to communicate between each other to validate the accuracy of Voronoi cells and fix them if needed, which yields significant network I/O.

FIG. 1 illustrates an example of a Voronoi diagram and its cells for nine generators. Given a set of generators $P=\{p_1, p_2, \ldots, p_n\}$ where $2 < n < \infty$ and $p_i \neq p_j$ for $i \neq j$, $i, j = 1; \ldots, n$, the Voronoi Cell of $p_i$ is $VC(p_i) = \{p | d(p, p_i) \leq d(p, p_j)\}$ for $i \neq j$ and $p \in VC(p_i)$ where $d(p, p_i)$ specifies the minimum distance between p and $p_i$ in Euclidean space. Voronoi diagrams have several geometric properties. The Voronoi diagram for a given set of generators is unique. On average, each generator has six adjacent generators, if the average number of Voronoi edges per Voronoi polygon is at most six ($n_e \leq 3n-6$ where n is the number of generators and $n_e$ is the number of Voronoi edges). The nearest generator point of $p_i$ (e.g., pj) is among the generator points whose Voronoi cells share similar Voronoi edges with $VC(p_i)$.

Figure 2:
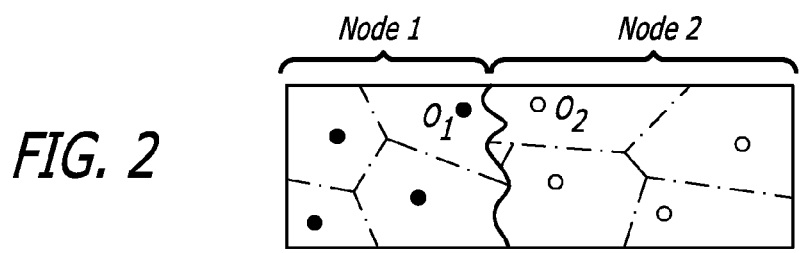
FIG. 2 is an exemplary diagram of two computing nodes for generating a Voronoi diagram of eight data objects, according to a further embodiment.
Figure 3:
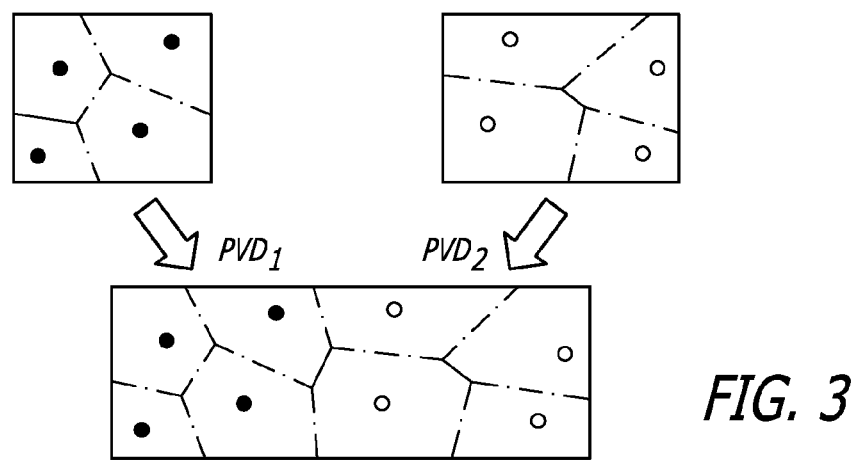
FIG. 3 is a diagram of an accurate Voronoi diagram, according to another embodiment.

FIG. 2 illustrates an example of two computing nodes that are asked to generate Voronoi Diagram of eight data objects. The objects are divided into two equally sized partitions where each node stores four objects. As shown, Voronoi cells of objects $o_1$ and $o_2$ are inaccurate. This is because even though $o_1$ and $o_2$ are Voronoi neighbors, they are sent to different nodes in which local Voronoi diagrams are created independently. FIG. 3 shows the accurate Voronoi Diagram of this particular example. To generate the correct Voronoi diagram the nodes need to communicate between each other (i.e., two-ways message passing). Obviously, as the number of inaccurate cells grows, the communication overhead increases significantly resulting in performance problems.

ToSS-it addresses the above challenge by (i) minimizing the number of network messages passed between the nodes by using a Voronoi-based partitioning technique, (ii) identifying whether a cell is accurate or not, and fixes only those cells through network messages, and (iii) including a replication technique which replicates the border objects in each partition to further reduce the number of network messages.

Data Partitioning: Given N number of nodes and a set of data objects O which are randomly distributed across the nodes, the purpose of this phase is to assign each object o, where $\forall o \in O$, to one of the N nodes.

The ideal partitioning should preserve spatial locality among the objects in each partition to minimize the number of inaccurate Voronoi cells (and hence message passing between the nodes). Towards this end, we propose a Voronoi-based partitioning technique. The main idea is that we select P number of pivot data objects, where each pivot corresponds to a partition. Subsequently, we assign each object 0, to its closest pivot. We use a two-step approach to select the pivots in a distributed manner. Initially we assume that the data objects are randomly distributed among the servers. This is a real life phenomenon because in real-world situations the moving objects report their location to such servers without any restriction or checking where to report. In the first step, each node identifies a set of randomly selected candidate objects and sends them to the master node. Upon receiving all candidates, the master node identifies P number of pivots and transmits P back to all nodes. We note that each pivot corresponds to a partition and each partition (that includes subset of 0) is stored in a separate node. ToSS-it can store more than one partition in a single node since the neighboring partitions in the same node can still preserve the spatial locality. Finally, after the set of pivots (each representing a node) are received, the nodes start to shuffle the objects by assigning each object 0 to the closest pivot (and hence its corresponding node). We formally define object and node mapping function as follows:

$f(o.location)=P_i$, where $d(o.loc, P_i)=\min\{d(o.loc, P_j)\}$,
$\forall P_j \in P$ where o.location is composed of a latitude and longitude value, and node $N_i$ stores partition $P_i$.

Figure 4:
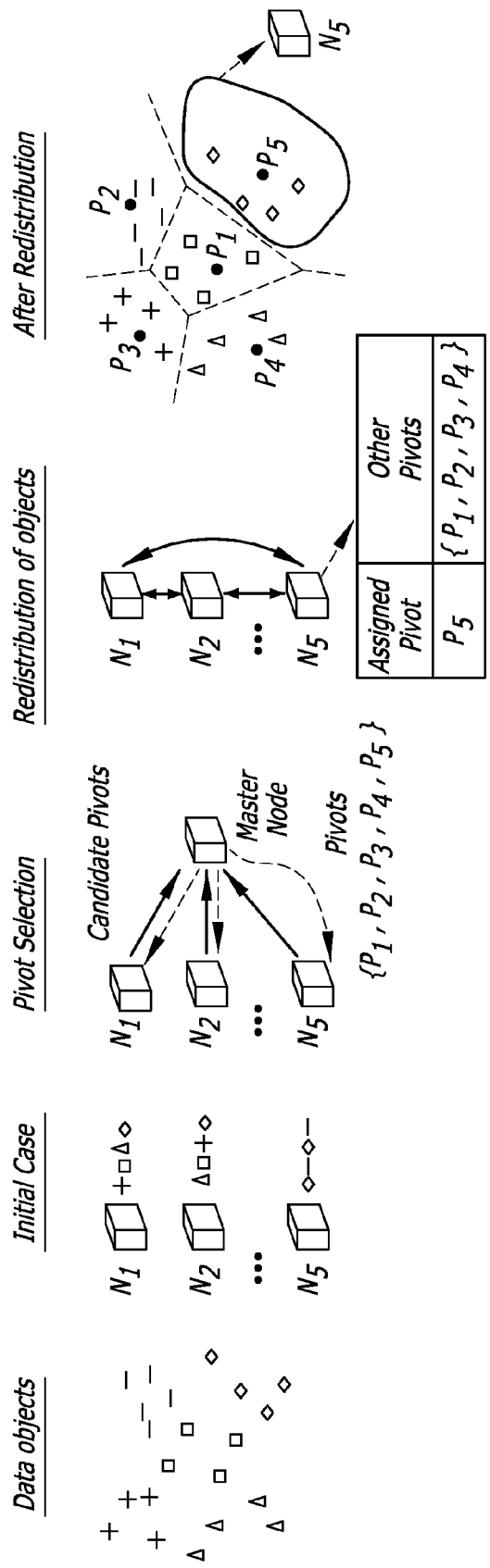
FIG. 4A is a diagram of a data partitioning approach for an initial case, according to another embodiment.
FIG. 4B is a diagram of a data partitioning approach for an initial case, according to yet another embodiment.
FIG. 4C is a diagram of a data partitioning approach pivot selection, according to another embodiment.
FIG. 4D is a diagram of a data partitioning approach for distribution of objects, according to another embodiment.
FIG. 4E is a diagram of a data partitioning approach for after redistribution, according to another embodiment.

FIG. 4 illustrates an example of our data partitioning approach. As shown in FIG. 4A and FIG. 4B, the data objects are initially randomly distributed across five nodes. First, the master node gathers a set of candidate pivots from each node and computes five pivot objects, and broadcasts them to the nodes (see FIG. 4C). At this point, each node is assigned a specific pivot and also stores the information about all the other pivots. For example, node $N_5$ is mapped to pivot $P_5$ and stores the information of the other pivots $\{P_1, P_2, P_3, P_4, P_5\}$ (see FIG. 4D). Finally, the nodes redistribute the objects based on the pivot set, where each object is assigned to the node with its closest pivot. Once the redistribution phase is completed, as shown in FIG. 4E spatially close objects are clustered in the same node.

Clearly, pivot selection is an important task to obtain balanced distribution among the nodes. Next, we discuss our distributed pivot selection algorithm. As we discussed, each node $N_i$, where $\forall N_i \in N$, initially stores $O_i$ number of objects i.e., random subset of O, where $1 \leq i \leq N$ and $O = \bigcup_{1 \leq i \leq N} O_i$. With our approach, each node randomly selects candidate $S_i$ objects among $O_i$ and sends $S_i$ to the master node. The master node generates S/P (where P is the number of pivots) number of random sets where each set has P objects. Then for each set, we compute the total sum of the distances between every two objects and choose the set with the maximum total sum as pivots. Finally, the master node broadcasts the pivots to all the nodes.

Pivot-&-node mapping is another very important point that we need to pay attention to reduce the network cost. The main idea is to reduce the number of objects which will go to another node in the redistribution phase. Rather than randomly assigning P pivots to N nodes, we take into account data distribution at each node. Specifically, we assign a selected pivot $P_i$ to the node which sent it to the master node. If a node's candidate pivots are not selected among the actual pivots, then we randomly assign a pivot to that node. For example, with this approach, if the data is already well clustered at node $N_j$, by assigning a pivot to $N_j$ which it selected as candidate, there is higher chance that objects in $N_j$ will be mapped to the node that they already reside in. Note that, for simplicity, in the rest of the description we assume that pivot $P_1$ is mapped to node $N_1$, and so on.

Local Voronoi Diagram Generation: In this phase, each node $N_i$ is asked to generate a local Voronoi diagram (LVD) for the corresponding objects o, where $\forall o \in O_i$. We have two specific goals in this phase: we aim to a) exploit all multicore CPUs available at $N_i$ to generate LVDs, and b) effectively identify and fix the Voronoi cells which might be inaccurate because of the partitioning.

A straightforward method to generate local Voronoi Diagram is to use sweepline algorithm. However, out-of-the-box sweepline algorihtrn is sequential and cannot be executed in parallel. Towards this end, we modify sweepline algorithm to utilize multicore CPUs. In particular, let $C_i$ be the number of cores available at node $N_i$. We break the problem into smaller pieces where each core c, where $\forall c \in C_i$, handles $O_i/C_i$ number of data objects. To distribute the objects across the cores we use the same partitioning technique used in the previous phase. First, c number of pivots are identified using random selection method. Then, each core c is assigned $O_i/C_i$ number of data objects. Subsequently, the sweepline algorithm is executed by each core c and $O_i$ number of Voronoi cells are generated in parallel as the final output at node N. As we discussed earlier, since the objects are divided into disjoint subsets, some of the generated Voronoi cells (VC) maybe incorrect because their Voronoi neighbors reside in different nodes. We define these generated cells as Inaccurate Voronoi Cell (IVC). The formal definition of IVC is as follows:

DEFINITION 2. Inaccurate Voronoi Cell (IVC)

Let P be a set of data points, $P^+$ and $P^-$ be subsets of P and $P^+ \cup P^- = P$. If we only consider the points in $P^+$, the generated Voronoi cells might not be accurate because there might be some points $p_j \in P^-$, which will decrease the area of the generated cells. Therefore, these cells might be inaccurate (IVC).

Now the challenge is how to identify whether a generated IVC is correct or not. To this extent, we need to identify a set of candidate objects that can possibly modify an IVC. If all these candidate objects reside in the same node, we know that the cell is accurate.

To identify inaccurate cells, we first compute, for each object o, $\forall o \in O_i$, an influence region IR(o) and then check IR(o) against the borders of the node $N_i$. If IR(o) falls inside the $N_i$, o does not need to be refined. Otherwise, o is marked as inaccurate. Note that, the inaccurate cells are the border objects of the partitions, and hence are a very small subset of Oi.

Figure 5:
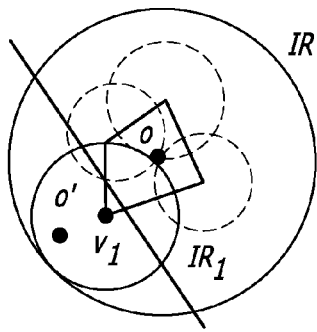
FIG. 5 is an influence region of an object, according to another embodiment.

Influence Region (IR) is computed based on current IVC. In particular, for each vertex v on the VC of an object 0, the locus of the points which can exclude v from the cell inside a circle centered at v with a radius r=d(v, 0). FIG. 5 illustrates the influence region of object o. As shown o' is inside the circle $IR_1$. The bisector crossing the line |o, o'| intersects with the VC causing the vertex $v_1$ being excluded from the cell. The set of circles $IR_i$ specifies the minimum influence region IR including all points that their presence in $P^+$ changes the IVC. The radius of circle centered at IR is $r_o = \max(d(o, v_i))$.

Figure 6A:
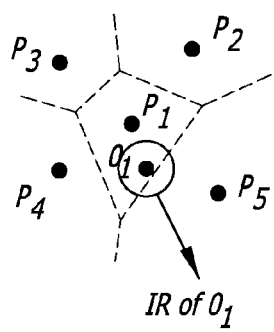
FIG. 6A is a diagram of an exemplary inaccurate Voronoi cell, according to another embodiment.

Geospatial replication: As we discussed local Voronoi diagrams in each node include inaccurate cells and we can identify them using IR. Once we identify the inaccurate Voronoi cells, we replicate their generator (data objects) across the partitions so that the potential inaccurate Voronoi cells are refined using local information. This enables us to avoid significant amount of network communication. In particular, to refine IVC of o, we first identify the candidate partitions with which IR(o) overlaps. Specifically, let CN(o) be the set of nodes need to be considered to refine o and $N_i$ be the node that stores o. N sends IR(o) to each of the nodes in CN(o) and asks for the objects within IR(o). Consequently, the IVC of o is refined based on the information passed to the node. FIG. 6A illustrates an inaccurate Voronoi cell $o_1$ whose influence region is crossing another partition, i.e., $P_5$. To refine $o_1$, $N_1$ will communicate with $N_5$ and ask for the objects inside IR($o_1$)

Figure 6B:
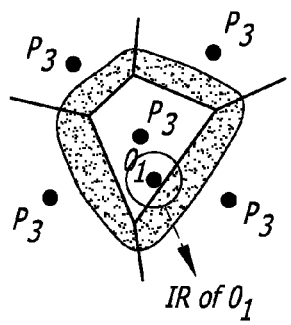
FIG. 6B is a diagram of an exemplary geospatial replication technique, according to yet another embodiment.

FIG. 6B illustrates our geospatial replication technique where the shaded area around partition $P_1$ is replicated into node $N_1$. In this specific case, $o_1$ does not need to be refined anymore. We note that replicating small amount of data improves the accuracy significantly. Our experiments show that by replicating 5% of the data objects, we can reduce the number of inaccurate cells by 70%. The question is that how much of the border objects should be replicated to accomplish maximum accuracy. Towards that end we use range selection technique where all the objects within a certain distance A (see FIG. 7) from the border of a partition are replicated. Note that, we replicate data objects at the partitioning phase by slightly modifying the object-&-partition mapping function f. The formal definition of the modified mapping function is as follows:

$$f(o.location, \lambda) = P_i, \{P_{ne}\}$$

where $d(o.location, P_i) = \min\{d(o.location, P_i)\}, \forall P_i \in P$. Let $VN(P_i)$ be the Voronoi neighbors of partition $P_i$ which originally contains o. Then $P_{ne} = \{Pj\}$, where $\forall P_j \in VN(P_i)$, $d(o, hp(P_i, P_j)) \leq \lambda$ and $hp(P_i, P_j)$ is the hyper plane (border line) between pivots $P_i$ and $P_j$. The computation of distance is $d(o, hp(P_i, P_j))$ using triangle inequality.

Figure 7:
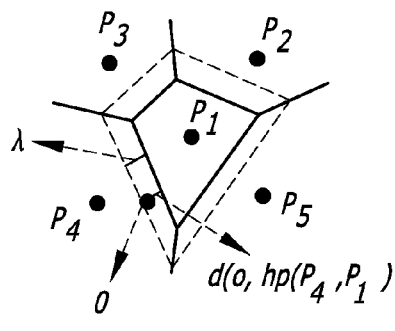
FIG. 7 is a diagram of an object-&-partition mapping with geospatial replication, according to yet another embodiment.

FIG. 7 shows an example of the object-&-partition mapping with geospatial replication. Partition $P_4$ is the closest pivot to object 0 so it is directly mapped to $P_4$. Subsequently, since $d(o, hp(P_4, P_1))$ is less than $\lambda$, it is mapped to $P_1$ as well. In this specific example, $P_{ne}$ is composed of only $P_4$; however in some cases an object might be mapped to more than two partitions. These are the objects that are at the intersection of multiple partitions.

Several approaches have been proposed that construct hierarchies on top of Voronoi diagrams. Rather than adapting such sophisticated techniques, we take a completely Voronoi-based approach where we organize the objects with hierarchies of Voronoi cells. A Voronoi hierarchy is defined as follows. A Voronoi cell of the higher level-i contains all Voronoi generators of the lower level-i that are closer to that level-i generator than to any other. The main advantage of this approach is that we can build Voronoi hierarchies by exploiting multi-core CPUs efficiently. Our bottom-up hierarchy generation algorithm is as follow. Let $f$ be the fan-out of a bucket and c be the number of cores available at a particular node. First, $f$ number of pivots are identified, using the same technique applied in the data partitioning phase. Then each core $c_i$ is assigned $f/c$ number of objects, and subsequently each $c_i$ maps the objects to their closest pivot. Once all objects are mapped, the same algorithm is iteratively executed for the higher level. In the following section, we show how we use these hierarchies to speed up query processing.

We use ToSS-it to evaluate two major types of spatial queries: range and k nearest neighbor (kNN). With ToSS-it, the queries can be submitted to any node in the system. This decentralization provides load balancing across ToSS-it nodes. The receiving-node either processes the query or forwards it to another node with one network message using the pivots we generated in the data partitioning phase.

In particular, let $N_{init}$ represent the server that receives query q (that includes the query type and the location of q), and $N_q$ represent the server that contains location of q. If q is contained in $N_{init}$ (i.e., $N_{init} = N_q$), the query is processed in $N_{init}$. Otherwise, $N_{init}$ finds $N_q$ using a random-walk algorithm on the pivot list, and then forwards q to $N_q$. Recall that each node maintains the list of pivots P, where each pivot corresponds to a node. The total cost of locating the node $N_q$ with random-walk is O(square root of P), where P is the number of pivots, and we consume only one network message for forwarding q from $N_{init}$ to $N_q$. We note that in distributed environments, the network message exchange between the nodes is the dominating cost, and ToSS-it minimizes this cost by using only one message. Moreover, the space requirement of storing P pivots at each node is very small. We store 8 bytes for the pivot location (latitude, longitude), and 32 bytes for the IP address of the host of each pivot. For example, given 1,000 pivots, the total space requirement of the pivot list is only 40 KB.

Once the node $N_q$ is found, ToSS-it processes the query using the local Voronoi Diagram (LVD) of $N_q$. Now we explain how we use ToSS-it to answer range and k-NN queries, respectively.

Given a dataset O, query point q, and distance r, range query q finds the objects O' of O such that $\forall o \in PO'$, |q, o| ≤ r.

Upon receiving query q, $N_q$ finds the set of nodes ($IN_q$) with which q intersects and forwards q to the nodes in $IN_q$. Subsequently, each node $N_i$, where $\forall N_i \in IN_q$, executes the query in parallel. To find $IN_q$, we first include all neighbors of $N_q$ into $IN_q$ and then refine it by using r. In particular, let $P_i$ be one of the neighboring partitions, if $d(q, hp(P_q, P_i)) > r$, then we remove $P_i$ from $IN_q$. Otherwise, we keep $P_i$ in $IN_q$ and add $P_i$'s neighbors to $IN_q$ as potential intersecting partitions. This process terminates once all the nodes in $IN_q$ are examined.

Figure 8:
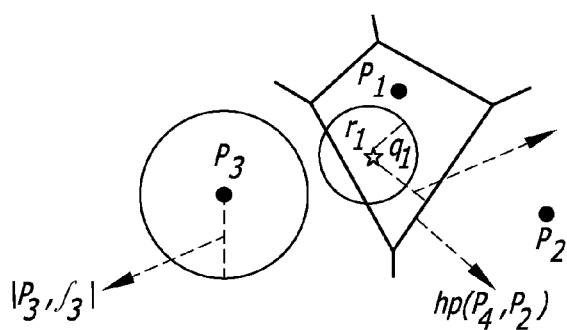
FIG. 8 is a diagram of an exemplary range query based on local Voronoi diagrams according to a still further embodiment.

FIG. 8 illustrates an example of a range query based on LVDs. Given a query $q_1$ with range $r_1$, we first locate pivot $P_1$ with the closest distance to $q_1$ and then initialize $IN_{q1}$ with $P_1$'s neighbors i.e., $P_2$ and $P_3$. Since $d(q_1, hp(P_1, P_2)) > r_1$, we remove $P_2$ from $IN_{q1}$. This means that there is no use for the LVD in the node corresponding to $P_2$, and hence no message needs to be sent. On the other hand, $d(q_1, hp(P_1, P_3)) < r_1$, thus we add $P_3$ and $P_3$'s neighbors to $IN_{q1}$. The algorithm runs until all the elements in $IN_{q1}$ are examined.

We can further improve the partition search algorithm by pruning false-positive partitions using the location of the furthest object (from the pivot) in that partition. In particular, even if Pi satisfies the equation, $d(q, hp(P_q, P_i)) < r$, we can discard it using the following rule.

PRUNING RULE. Furthest Object

LEMMA-1: Let $f_i$ be the location of the furthest object in the partition from the pivot $P_i$, where $f_i = \max\{|o, P_i|\}, \forall o \in O_i$. Given a query q with a range r, even though $d(q, hp(P_q, P_i)) < r$, if $|P_q, P_i| > |P_i, f_i| + r$ then no object in $P_i$ can be in q's range.

The proof is straightforward, and we explain it using FIG. 8. As shown, $q_1$ intersects with partition $P_3$; however, by keeping the location of the furthest object $f_3$, we guarantee that $q_1$ does not cover any object of $P_3$.

Finally, once $IN_q$ is computed, we forward q to each node in $IN_q$ and execute the query using the local Voronoi diagrams. For the rest of the query processing, we iteratively traverse Voronoi hierarchies using the same pivot locating and pruning strategies described above. The cost of this top-down traversal is (square root of f) ● h, where h is the height of the hierarchy and f is the fan-out. Once local query processing is completed, each node sends its partial result to the query issuer.

Given a query point q and a set of data objects O, k Nearest Neighbor (kNN) query finds the k closest data objects $o_i \subseteq O$ to q where $d(q, o_i) \leq d(q, o)$.

The straightforward strategy to process a kNN query is to locate the Voronoi cell that contains q and then execute the sequential kNN algorithm as in centralized systems. The problem with this approach is that when the value of k is large, the performance degrades, especially when q retrieves objects from multiple nodes. We propose an incremental algorithm, to answer kNN queries using multiple nodes in parallel. The main intuition is to start the search with an estimated range, and enlarge the search range until enough number of objects is found. Thus, we express a kNN query as a sequence of range queries. First, we locate the node $N_q$ which contains q and set an initial radius $r_{init}$ using the following equation which gives distance estimation between q and its k nearest neighbor in two-dimensional space:

$$r_{init} = ed(k)/k \quad (1)$$

$$ed(k) = ((2*(\text{square root of } 1))/(\text{square root of } \pi)*(1 - (\text{square root of } (1-(\text{square root of } (k/O)))))) \quad (2)$$

where O is the total number of objects. Subsequently, $N_q$ locates the nodes within the $r_{init}$ range, and asks those nodes to execute a range query with $r_{init}$. Each node reports back the number of objects from their range query. If the number of objects is not enough (i.e., less than k), we increase $r_{init}$ by ed(k)/k and continue to increase until we find k objects. Once we have enough number of objects, the nodes send these candidate objects and $N_q$ selects the closest k objects to q as results.

A novel approach, ToSS-it, to index highly dynamic moving object data. The main idea behind ToSS-it is to build short-lived Voronoi based index structures instead of updating indexes with each location update from the moving objects. ToSS-it creates the throwaway indexes in a very short time by employing a parallel and distributed architecture that uses multiple nodes in a cluster and exploits multi-core CPUs in each node. Moreover, we proposed an efficient parallel search algorithm with which queries can be submitted to any node in the cluster without looking for the relevant node that may include the result-sets which provides decentralization. ToSS-it yields a very high query throughput and scales near-linearly with the number nodes in the cluster. In particular, we can generate ToSS-it for 64 million objects in less than 40 seconds using 128 nodes and process around 30,000 circular range queries per second. The total amount of time to construct ToSS-it from scratch remains almost constant even if the data size increases, which verifies the scalability of ToSS-it.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification are approximate, not exact. They are intended to have a reasonable range which is consistent with the functions to which they relate and with what is customary in the art to which they pertain.

Thus, a number of preferred embodiments have been fully described above with reference to the drawing figures. Although a description has been provided based upon these preferred embodiments, it would be apparent to those of skill in the art that certain modifications, variations, and alternative constructions could be made to the described embodiments.

It should be understood, of course, that the foregoing relates to exemplary embodiments and that modifications may be made without departing from the spirit and scope of what has been described as set forth in the following claims. Furthermore, a method herein described may be performed in one or more sequences other than the sequence presented expressly herein.

We claim:

1. A method, comprising:
    finding, by at least one computer system in response to a query having an associated location in a network of nodes and edges, a specified number of data objects;
    distributing point objects across multiple servers;
    generating a local Voronoi diagram at multiple servers;
    identifying inaccurate Voronoi cells;
    replicating border cells; and
    generating a hierarchical Voronoi index structure at each server.

2. The method of claim 1, comprising using the index structure to perform data object and edge weight updates.

3. A tangible, non-transitory computer-readable medium encoding a computer program product operable to cause data processing apparatus of a searching system, to perform operations, comprising:
- finding, in response to a query having an associated location, a specified number of data objects;
- distributing point objects across multiple servers;
- generating a local Voronoi diagram at multiple servers;
- identifying inaccurate Voronoi cells;
- replicating border cells; and
- generating a hierarchical Voronoi index structure at each server.

4. The tangible, non-transitory computer-readable medium of claim 3, wherein the operations performed further comprise using the index structure to perform data object and edge weight updates.

* * * * *